United States Patent
Okada et al.

(10) Patent No.: US 6,606,293 B1
(45) Date of Patent: Aug. 12, 2003

(54) OPTICAL INFORMATION RECORDING MEDIUM AND METHODS FOR RECORDING, READING, AND ERASING INFORMATION THEREUPON

(75) Inventors: Mitsuya Okada, Tokyo (JP); Shuichi Ohkubo, Tokyo (JP); Masaki Itoh, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/478,701

(22) Filed: Jan. 6, 2000

(30) Foreign Application Priority Data

Jan. 11, 1999 (JP) .............................. 11/004717

(51) Int. Cl.⁷ .......................... G11B 7/0037; G11B 7/24
(52) U.S. Cl. ...................... 369/94; 369/275.2; 369/283
(58) Field of Search ...................... 369/94, 283, 286, 369/275.2, 275.1, 100

(56) References Cited

U.S. PATENT DOCUMENTS

| | | | | |
|---|---|---|---|---|
| 5,249,175 A | * | 9/1993 | Akahira et al. | 369/275.1 |
| 5,342,714 A | * | 8/1994 | Ide | 430/19 |
| 5,485,452 A | * | 1/1996 | Maeda | 369/284 |
| 5,521,901 A | * | 5/1996 | Okada et al. | 369/275.2 |
| 5,627,816 A | * | 5/1997 | Ito et al. | 369/275.1 |
| 5,958,649 A | * | 9/1999 | Hirotsune et al. | 430/270.13 |
| 5,962,100 A | * | 10/1999 | Kawai | 428/64.1 |
| 6,190,750 B1 | * | 2/2001 | Wierenga et al. | 428/64.1 |
| 6,252,844 B1 | * | 6/2001 | Kubogata | 369/275.2 |

FOREIGN PATENT DOCUMENTS

| | | | | |
|---|---|---|---|---|
| JP | 60-133552 | 7/1985 | ............ | G11B/7/24 |
| JP | 3-157830 | 7/1991 | ............ | G11B/7/24 |
| JP | 8-306070 | 11/1996 | ............ | G11B/7/24 |
| JP | 9-81962 | 3/1997 | ............ | G11B/7/24 |
| JP | 10-49915 | 2/1998 | ............ | G11B/7/24 |
| JP | 10-188351 | 7/1998 | ............ | G11B/7/24 |
| JP | 10-293942 | 11/1998 | ............ | G11B/7/24 |
| JP | 2000-21016 | 1/2000 | ............ | G11B/7/24 |

OTHER PUBLICATIONS

"Multilevel Volumetric Optical Storage" Rubin et al SPIE; vol. 2338; 1994 pp. 247–253.

"Dual Layer Type Rewritable Phase Change Optical Disk" Nagata et al 15a–V–5; 59th Autumn Meeting; Sep. 15, 1998 p. 1008.

"Erasable Optical Disk Techniques" Triceps Publishing Company, Japan; 1991 p. 249.

* cited by examiner

*Primary Examiner*—Doris H. To
*Assistant Examiner*—Gautam R. Patel
(74) *Attorney, Agent, or Firm*—Hayes Soloway P.C.

(57) ABSTRACT

There is disclosed an optical information recording medium having phase-change recording films whose the transmittance can be made substantially uniform irrespective of the presence or absence of recording. There are also disclosed methods for recording, reading, and erasing information well at a high density on such a medium. Each of the phase-change recording films other than the top one has a phase-change recording film for recording and erasing information by a phase change caused by illumination of laser light. A transparent upper protective film is formed on the phase-change recording film to protect the phase-change recording film mainly against thermal deformation during recording and erasing of information. A transparent lower protective film is formed under the phase-change recording film to protect the phase-change recording film mainly against thermal deformation during recording and erasing of information. A foundation interference film is formed under the transparent lower protective film to adjust the transmittance of the phase-change recording film for the laser light.

19 Claims, 5 Drawing Sheets

OPTICAL INFORMATION RECORDING MEDIUM AND METHODS FOR RECORDING, READING, AND ERASING INFORMATION THEREUPON

BACKGROUND OF THE INVENTION

The present invention relates to an optical information recording medium and methods for recording, reading, and erasing information using laser light and, more particularly, to an optical information recording medium adapted to recording of information at a high density and methods of recording, reading, and erasing information on such an optical information recording medium.

Optical disk recording using laser light is being put into practical use as large-capacity memories because large amounts of information can be recorded and non-contact, high-speed access is permitted. Optical disks are classified into (i) read-only type, such as compact disks and laser disks, (ii) write-once-read-many (WORM) on which the user himself or herself can record, and (iii) rewritable type permitting the user to record and erase repeatedly. WORM and rewritable optical disks are used as external memories for computers and as recording media for storing text and image files.

With respect to a read-only optical disk, those adapted for data files typified by CD-ROMs have rapidly become widespread and are used as high-density recording media in personal applications. In view of this large capacity of CD-ROMs, it has been discussed that read-only optical disks will be used to hold multimedia files including image data by making use of image compression techniques such as MPEG-2. In these applications, the existing capacity of 650 MB per disk is not sufficient. Therefore, DVD-ROMs having a capacity 8 times as large as that of the present media have started to be put on the market. On the other hand, with respect to read-only products used in civil applications for image files as typified by laser disks, DVD players providing small-sized high-quality images have started to appear on the market. However, higher-density recording on optical disks aimed at high-definition reproduction remains an important issue.

On the other hand, the write-once-read-many (WORM) optical disk has the advantage that recorded information can be stored stably. In applications where full use is made of this advantage, WORM optical disks have a certain share of the market. In addition, in these applications, large capacities and higher densities are important in making use of the merit of large scale.

Rewritable optical disks include phase-change optical disks utilizing phase change of recording layers and magneto-optical (M-O) disks employing changes in vertical magnetization film in the direction of magnetization. Among them, MO disks having 4 times capacity of first generation has started to appear on the market. Disks having 8 times or more capacities are being discussed. On the other hand, phase-change optical disks need no external magnetic field and can easily implement overwrite. It is expected that phase-change optical disks will become the mainstream of rewritable optical disks in future, together with MO disks. Also in the case of phase-change optical disks, commercial products having 8 times the capacity of that of the MO disk have started to appear on the market, as typified by 2.6 GB DVD-RAMs. Larger capacities and higher densities are also important for these rewritable optical disks.

The structures of these conventional optical disks are next described. Pits and lands/grooves have been previously formed on a substrate of a read-only optical disk by injection molding. A reflective metal layer of an Al alloy is formed on the pits and lands/grooves.

In the WORM optical disk, an alloy material of Te, Bi, Se, Sn, or other low-melting-point material is formed as a thin layer or a dye material is applied as a thin layer on a substrate. The dye material shows absorbing characteristics at the wavelength of the used laser light. This fabrication step results in a recording layer.

A rewritable MO disk uses a sandwich structure having a thin film of an alloy of Tb, Gd, Dy, Ho, or other rare-earth metal and Fe, Co, Ni, or other transition metal. This thin film is sandwiched between transparent protective films of SiN or the like.

In a rewritable, phase-change optical disk, a thin film of chalcogenide-based material such as GeSbTe, AgInSbTe or InSbTe is used as a recording film. Examples of material of thin films acting as recording layers of phase-change optical disks include InSe, InTe, AsTeGe, $TeO_x$—GeSn, TeSeSn, SbSeBi, and BiSeGe. These thin films are formed by resistive heating vacuum evaporation, electron-beam evaporation, sputtering, or spin-coating techniques.

Although there is a demand for larger capacities and higher densities in this way, the conventional read-only, write-once-read-many, and rewritable optical disks use a single-layer structure. That is, formed on a substrate having transparency and rigidity is a write-once-read-many (WORM), MO, or phase-change recording film, as well as pits and lands/grooves.

Furthermore, a partial ROM disk fabricated by forming a read-only portion, a write-once-read-many (WORM) portion, and a rewritable portion that are separated from each other in a radial direction of a substrate has been proposed and manufactured (for example, see "Erasable Optical Disk Techniques", p. 249, Triceps Publishing Company, Japan, 1991).

However, the aforementioned optical disk and hybrid disks are of the single-layer structure and so it is difficult to increase their recording capacities drastically. In the case of a double-layer disk fabricated by gluing together disks to improve the recording capacity, the head structure must be modified to permit simultaneous access to both layers. This increases the cost. Hence, it is difficult to implement this scheme.

Accordingly, with respect to read-only optical disks, read-only multilayer disks that permit access from one side to two or more layers has been proposed (e.g., Proc. of The International Society for Optical Engineering, Vol 2338, "Multilevel Volumetric Optical Storage", by K. Rubin et al., WA3-1, Optical Data Storage Meeting Technical Digest (1994). In addition, a method of reading information from two layers on one side, based on read-only DVD standards that stipulate two-layer disks, has been adopted.

Where improvement of the recording density of optical disks is considered, rewritable optical disks permitting rewriting of information are quite useful. Therefore, it has been required to secure practical performance with one-side multilayer structure, and this technique has been discussed.

Accordingly, an optical information recording medium having two recording layers as a rewritable optical disk utilizing phase changes has been proposed (Japanese Patent Laid-Open No. 157830/1991). Additionally, two-layer recording on a phase-change optical disk has been reported (for example, an Extended Abstract of The Japan Society of Applied Physics, titled "Dual Layer Type Rewritable Phase Change Optical Disk" by Nagata et al., 15a-V-5, p. 1008, the 59th Autumn Meeting, 1998, Sep. 15, 1998).

With the known optical information recording medium described in the above-cited Japanese Patent Laid-Open No. 157830/1991, recordings are not made on two recording layers. Rather, a two-layered structure is merely adopted as a means for applying a desired phase difference to reproduced signals. In consequence, improvement of the recording capacity is not sufficient.

In the case of the optical disk reported in the Applied Physics Society of Japan described above, an optical change in the first recording layer normally makes a great difference in transmittance between a recorded portion and an adjacent non-recorded portion. Therefore, the amount of light transmitted to the second layer differs greatly, depending on whether a recording is made on the first layer or not. For this reason, good recording and reading cannot be accomplished unless the power level of light shone during recording and reading on the second layer is changed.

SUMMARY OF THE INVENTION

In view of the foregoing problems, the present invention has been made.

It is an object of the present invention to provide an optical information recording medium capable of making substantially uniform the transmittance of a phase-change recording film, irrespective of whether each location contains a bit of information, preferably permitting good recording, reading, and erasing of information at a high density.

It is another object of the invention to provide a method of recording, reading, and erasing information well at a high density on the optical information recording medium described just above.

An optical information recording medium in accordance with the present invention has a transparent substrate and phase-change optical recording layers laminated on the substrate. Each phase-change optical recording layer has a phase-change recording film, a transparent upper protective film formed on top of the phase-change recording film, a transparent lower protective film formed under the phase-change recording film, and a foundation interference film formed under the transparent lower protective film. Information is recorded and erased on the phase-change recording film by a phase change caused by illumination of laser light. The transparent upper protective film protects the phase-change recording film against thermal deformation during recording and erasing of information. The transparent lower protective film protects the phase-change recording film against thermal deformation during recording and erasing of information. The foundation interference film adjusts the transmittance of the phase-change recording film for the laser light.

In the present invention, the foundation interference film is formed to adjust the transmittance of the phase-change optical recording layer for laser light. Therefore, the transmittance is kept almost constant irrespective of the presence or absence of recorded information. Accordingly, high-density, good recording, reading, and erasing of information are made possible by stacking such phase-change optical recording layers.

Preferably, the transmittance of recorded regions of the second phase-change recording film is 0.90 to 1.10 times the transmittance of unrecorded regions.

The aforementioned phase-change recording film contains at least one element selected from the group consisting of Ge, Sb, and Te.

The first transparent upper protective film, first transparent lower protective film, second transparent upper protective film, and second transparent lower protective film can contain ZnS and $SiO_2$.

The above-described foundation interference film contains at least one element selected from the group consisting of Si and Ge.

The transparent films described above may be made of a radiation-curable resin.

The above-described optical information recording medium further includes a light transmitting spacer formed on the phase-change optical recording layer and a second phase-change optical recording layer formed on the, light transmitting spacer. The second phase-change optical recording layer has a second phase-change recording film on which information is read and erased by a phase change caused by illumination of laser light, a second transparent upper protective film formed on top of the second phase-change recording film, and a second transparent lower protective film formed under the second phase-change recording film. The second transparent upper protective film protects the second phase-change recording film against thermal deformation during recording and erasing of information. The second transparent lower protective film protects the second phase-change recording film against thermal deformation during recording and erasing of information.

Two optical information recording media, each having the construction described above, may be bonded together by bonding together their top phase-change optical recording layers.

A method of recording, reading, and erasing information in accordance with the present invention is for use with an optical recording medium having a light transmitting substrate and plural phase-change optical recording layers laminated over each other via light transmitting spacers. The top layer of the phase-change optical recording layers has a first phase-change recording film for recording, reading, and erasing information by a phase change caused by illumination of laser light, a first transparent upper protective film formed on top of the first phase-change recording film, and a first transparent lower protective film formed under the first phase-change recording film. The first transparent upper protective film acts to protect the first phase-change recording film against thermal deformation during recording and erasing of information. The first transparent lower protective film serves to protect the first phase-change recording film against thermal deformation during recording and erasing of information. Each of the other phase-change optical recording layers includes a second phase-change recording film for recording and erasing information by a phase change caused by illumination of laser light, a second transparent upper protective film formed on top of the second phase-change recording film, a second transparent lower protective film formed under the second transparent recording lower protective film, and a foundation interference film formed under the second transparent lower protective film. The second transparent upper protective film protects the second phase-change recording film against thermal deformation during recording and erasing of information. The second transparent recording lower protective film protects the second phase-change recording film against thermal deformation during recording and erasing of information. The foundation interference film adjusts the transmittance of the second phase-change recording film for the laser light. This method consists of directing laser light to the optical information recording medium from a side of the light transmitting substrate while varying the focal point to cause a phase change in at least one of the first and second phase-change recording films.

DESCRIPTION OF THE PREFERRED EMBODIMENTS

Figure 1:
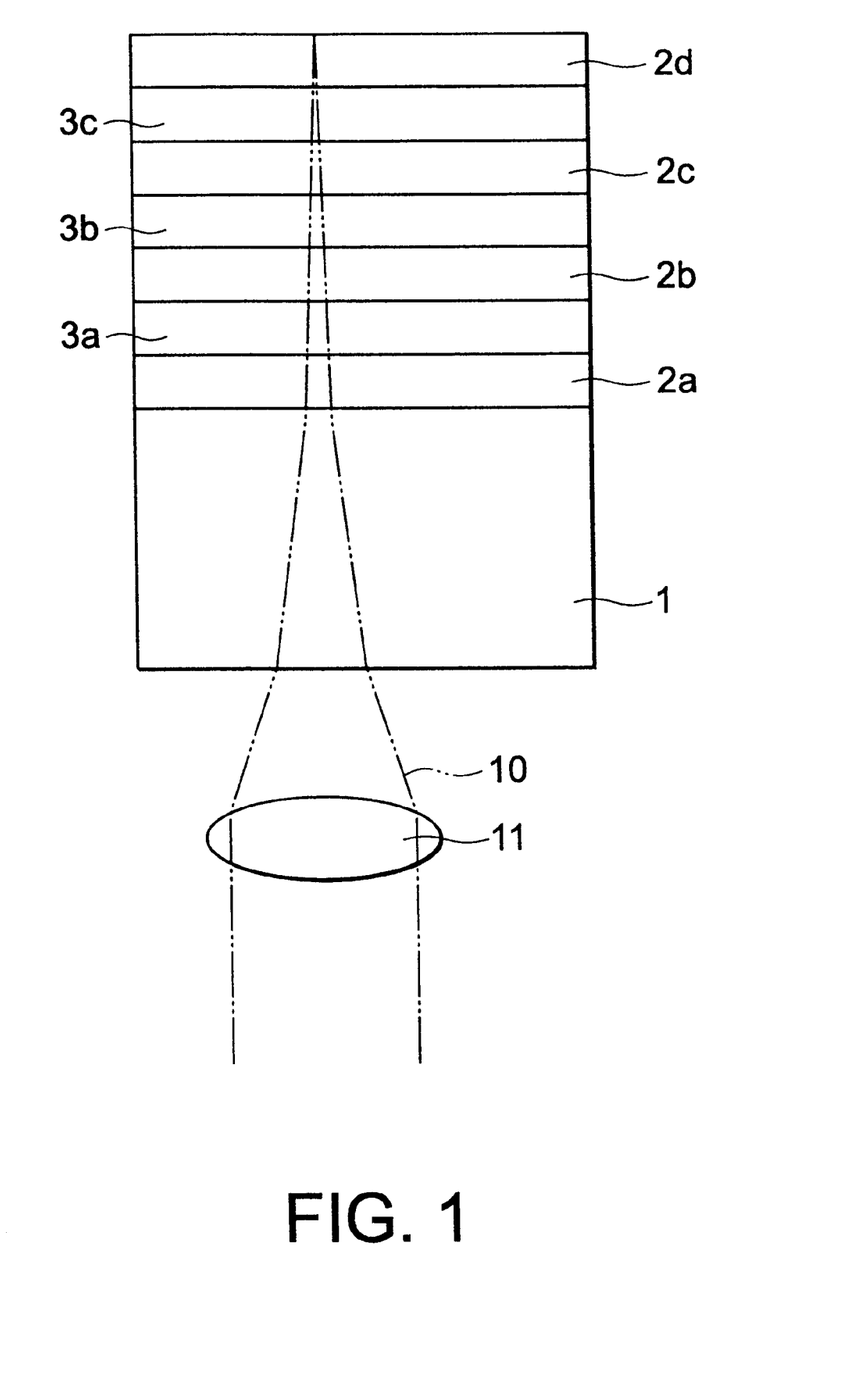
FIG. 1 is a schematic cross section of an optical information recording medium in accordance with a first embodiment of the present invention.

Optical information recording media in accordance with the preferred embodiments of the invention are hereinafter described in detail by referring to the accompanying drawings. FIG. 1 is a schematic cross section of an optical information recording medium in accordance with a first embodiment of the invention.

In this first embodiment, three phase-change optical recording layers 2a–2c are laminated on a light transmitting substrate 1 via light transmitting spacers 3a and 3b. A further phase-change optical recording layer 2d is formed over the third phase-change optical recording layer 2c via a light transmitting spacer 3c. Information is recorded, read, or erased by causing laser light to shine on the phase-change optical recording layers 2a–2d.

Either a transparent resinous substrate or a glass substrate can be used as the light transmitting rigid substrate 1. The thickness of the disk is only required to give sufficient rigidity to the disk and, therefore, the thickness can be 1.2 mm, 0.4 mm, 0.6 mm, or 0.8 mm normally used for compact disks, depending on the design value of the focusing lens of the used optical disk heads. The thickness of the substrate can be made larger than 1.2 mm.

Figure 2:
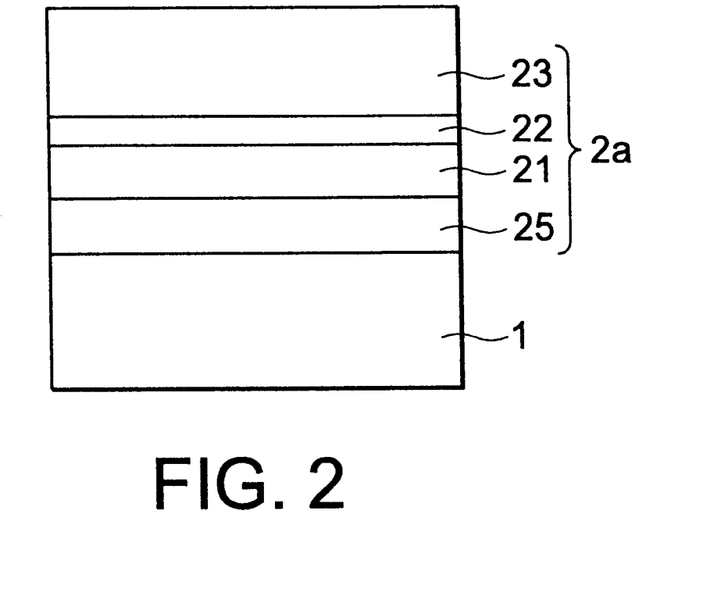
FIG. 2 is a cross-sectional view of a first phase-change optical recording layer 2a of the recording medium shown in FIG. 1.

Each of the phase-change optical recording layers 2a–2c comprises a foundation interference film, a transparent lower protective film, a phase-change recording film, and a transparent upper protective film. FIG. 2 is a cross section showing the structure of the first phase-change optical recording layer 2a.

A foundation interference film 25 is formed on the light transmitting rigid substrate 1. To produce interference effects, the interference film 25 is made of a material having a high index of refraction. Examples of usable material include Si and Ge. An oxide film consisting mainly of Si can also be used. A nitride film consisting chiefly of Si, an oxide film consisting principally of Ge, and a nitride film consisting mainly of Ge may also be employed. Obviously, if interference effects are obtained, other dielectric films having high indices of refraction may also be used. The transmittance of the phase-change recording film 22 for the laser light is adjusted by the foundation interference film 25.

A transparent lower protective film 21 is formed on the foundation interference film 25 to protect the phase-change recording film 22 mainly against thermal deformation during recording and erasing of information. The transparent lower protective film 21 consists chiefly of ZnS and $SiO_2$.

The phase-change recording film 22 is formed on the transparent lower protective film 21 and consists mainly of Ge, Sb, and Te. Examples of the material of the film include $Ge_2Sb_2Te_5$, $GeISb_2Te_4$, and $GeISb_4Te_7$. A small amount of Ge, Sb, or Te may be added to these materials. Furthermore, a trace amount of a group IV element of the Periodic Table, such as Pd, Pt, Au, Ag, Ti, or Cu, may be added. Since the thickness of the phase-change recording film 22 is about 5 to 30 nm, a high transmittance is obtained.

A transparent upper protective film 23 is formed on the phase-change recording film 22 to protect it mainly against thermal deformation during recording and erasing of information. The top protective film 23 is mainly made of ZnS and $SiO_2$ in the same way as the transparent lower protective film 21.

The phase-change optical recording layers 2b and 2c are similar in structure to the phase-change optical recording layer 2a except that the foundation interference film is formed not on the light transmitting rigid substrate 1 but on the light transmitting spacer 3a or 3b.

Figure 4A:
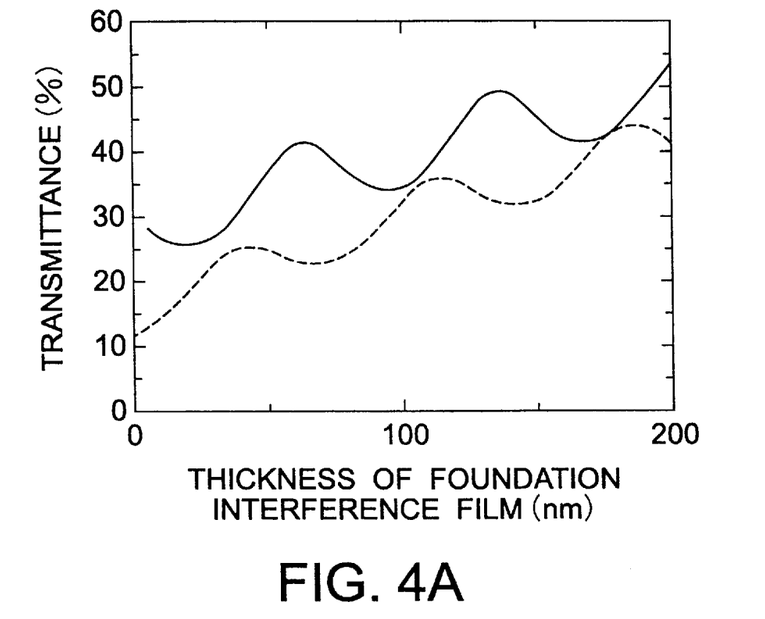
FIG. 4A is a graph showing the relation between the thickness of a foundation interference film included in the recording medium shown in FIG. 1 and the transmittance or reflectivity.
Figure 4B:
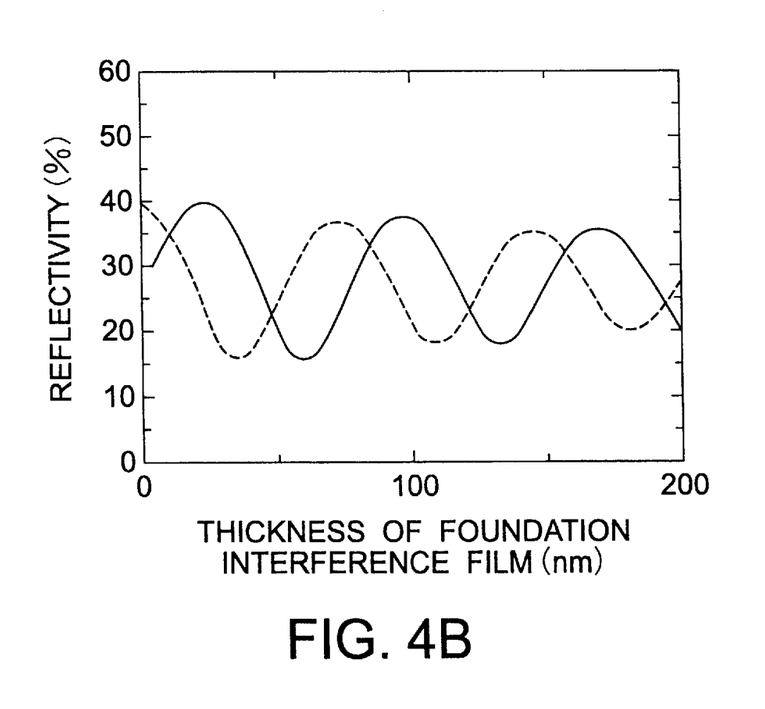
FIG. 4B is a graph showing the relation between the thickness of another foundation interference film and the transmittance or reflectivity.

By appropriately setting the thicknesses of the foundation interference films of the phase-change optical recording layers 2a–2c, the difference in transmittance made depending on whether recording mark is present or not can be suppressed greatly. In FIGS. 4A and 4B, the thickness of each foundation interference film is plotted on the horizontal axis, while the transmittance or reflectivity (reflectance) is plotted on the vertical axis. In FIGS. 4A and 4B, the solid lines indicate regions where recording marks are present, i.e., recordings are made. The broken lines indicate regions where no recording marks are present, i.e., no recordings are made.

The optical characteristics shown in FIGS. 4A and 4B have been obtained from the following phase-change optical recording layers. A Si film was used as a foundation interference film. The optical constants of the foundation interference film are Si (4.52, 0.15i). The transparent lower protective film and the transparent upper protective film are made of ZnS—$SiO_2$. The optical constants of the transparent lower protective film and the transparent upper protective film are ZnS—$SiO_2$ (2.10, 0.0i). The film thickness is 150 nm. The phase-change recording film is made of GeSbTe.

The optical constants of the phase-change recording film are GeSbTe (3.91, 4.22i) in a crystalline state and GeSbTe (4.13, 1.89i) in an amorphous state. The film thickness is 16 nm. The wavelength of the laser light is 660 nm.

As shown in FIG. 4A, assuming that the Si film acting as a foundation interference film has a thickness of 100 nm, the transmittance of the GeSbTe in an amorphous state corresponding to recorded marks is 37.2%. The transmittance of the GeSbTe in a crystalline state corresponding to unrecorded state (i.e., erased state) is 36.4%. In this way, the transmittance of the phase-change recording film in an amorphous state is 1.03 times as high as the transmittance of the phase-change recording film in a crystalline state. Hence, the difference in transmittance is quite small. Information can be recorded, read, and erased well. Preferably, the transmittance of the recorded regions of the phase-change recording film is 0.90 to 1.10 times that of the unrecorded regions.

The phase-change optical recording layers 2a–2c can be designed to exhibit transmittance of 30–50% in this way.

The light transmitting spacer 3 has a thickness of 5 to 30 μm and is made of a radiation-curable resin-such as a photopolymer. The thickness of the light transmitting spacer 3 is set sufficiently larger than the depth of focus determined by the characteristics of the used focusing lens and by the wavelength of the laser light. By making variable the focal point of the incident focused laser light, recording, reading, and erasing can be performed on the phase-change optical recording layers 2a–2d.

Figure 3:
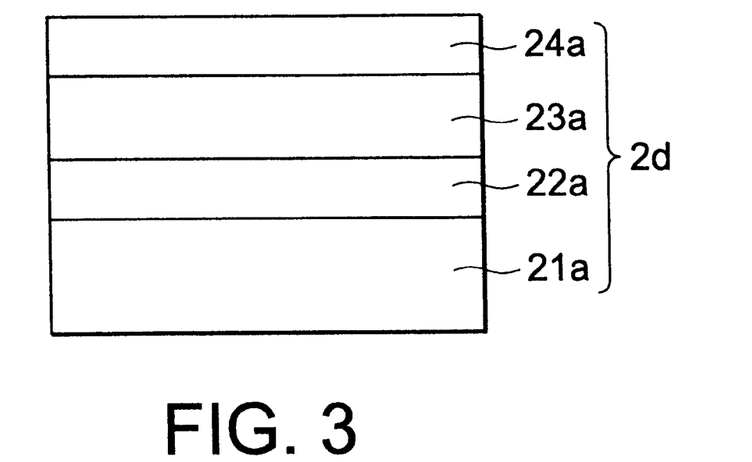
FIG. 3 is a cross-sectional view of a fourth phase-change optical recording layer 2d of the recording medium shown in FIG. 1.

The fourth phase-change optical recording layer 2d is composed of a transparent lower protective film, a phase-change recording film, a transparent upper protective film, and a metallic reflective film. FIG. 3 is a cross-sectional view showing the fourth phase-change optical recording layer 2d.

The phase-change optical recording layer 2d consists of a transparent lower protective film 21a, a phase-change recording film 22a, and a transparent upper protective film 23a laminated on the light transmitting spacer 3c in the same way as the first through third phase-change optical recording layers 2a–2c, respectively. Materials of these films are the same as the materials of those of the first through third phase-change optical recording layers 2a–2c, respectively.

A metallic reflective film 24a is formed on the transparent upper protective film 23a in the phase-change optical recording layer 2d. The metallic reflective film 24a consists chiefly of Al, Ag, Au, Pt, or the like.

Where the metallic reflective film 24a is not provided, light is reflected off the top phase-change optical recording layer. Where it is not necessary to transmit light, it is desired to form a metallic reflective layer on the top phase-change optical recording layer to permit the reflected light to be efficiently utilized for reproduction of signals.

In the first embodiment, laser light 10 used for recording, reading, or erasing of information is focused by a focusing lens 11 and entered through the light transmitting rigid substrate 1 from the outside, as shown in FIG. 1.

Therefore, where recording and reading are made on the top phase-change optical recording layer, laser light transmitted through the underlying phase-change optical recording layers is utilized and so it is necessary to set the thicknesses of the films such that the transmittance of the phase-change optical recording layers are in excess of a given value at the wavelength of the used laser light.

Where the transmittance differs greatly, depending on whether there is a recording mark or not, in each region of the first through third phase-change optical recording layers 2a–2c, respectively, the transmittance differs among those regions. Accordingly, the amount of light arriving at the subsequent layers and the amount of reflected light produce differences. Consequently, the recording density deviates, and the reading characteristics are varied.

In the present embodiment, the transmittance of the phase-change optical recording layers 2a–2c can be controlled by adjusting the thicknesses of the foundation interference films as mentioned above. In consequence, the transmittance difference due to the presence and absence of recording marks can be suppressed. Therefore, information can be recorded and read well.

Figure 5:
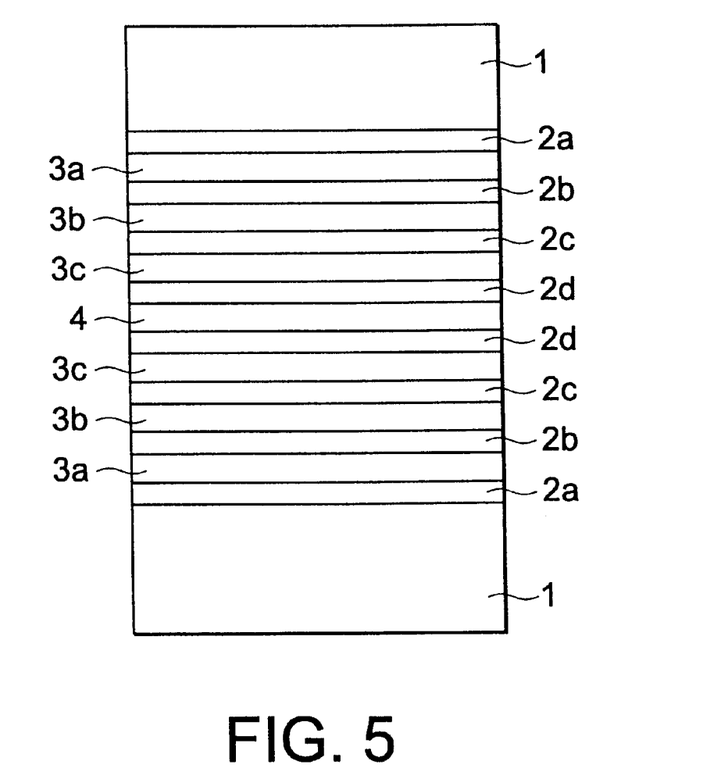
FIG. 5 is a cross-sectional view of an optical information recording medium in accordance with Example 2 of the invention.

A second embodiment of the present invention is next described. In this second embodiment, two optical information recording media of the construction according to the first embodiment are bonded together. FIG. 5 is a cross-sectional view showing the structure of the optical information recording medium according to the second embodiment. Note that like components are indicated by like reference numerals in both FIGS. 1 and 5 and that those components which have been already described in connection with FIG. 1 will not be described below.

In the second embodiment, two optical information recording media of the construction in accordance with the first embodiment are used. Their fourth phase-change optical recording layers 2d are bonded together via an adhesive layer 4.

The second embodiment constructed in this way yields the same advantages as the first embodiment. In addition, the second embodiment provides a storage capacity that is twice as large as the storage capacity offered by the first embodiment, because both sides are rewritable.

EXAMPLES

Examples of the present invention are hereinafter described in detail while comparing them with Comparative Examples that are not within the scope of the invention delineated by the appended claims.

First, a polycarbonate substrate having a diameter of 120 mm, a thickness of 0.6 mm, and a track pitch of 1.0 μm was prepared as a light transmitting rigid substrate. A foundation interference film whose data are listed in Table below was formed on the light transmitting rigid substrate. Then, ZnS—$SiO_2$ was sputtered as a transparent lower protective film having a thickness of 150 nm on the foundation interference film. Subsequently, $Ge_2Sb_2Te_5$ was sputtered as a phase-change recording film to a thickness of 16 nm on the light transmitting protective film. Then, ZnS—$SiO_2$ was sputtered to a thickness of 150 nm as a transparent upper protective film. In this manner, the first phase-change optical recording layer was formed.

Thereafter, a UV-curable resin was spin-coated to a thickness of 25 μm on the transparent upper protective film. Then, a transparent stamper having a pregrooved track was brought into intimate contact with the UV-curable resin. The UV-curable resin was then UV-cured, and the stamper was removed. As a result, a good grooved track having a track pitch of 1.0 μm was transferred to the UV-curable resin. In this manner, a light transmitting spacer was created.

Then, ZnS—$SiO_2$ was sputtered to a thickness of 170 nm on the light transmitting spacer to form the second transparent lower protective film. Thereafter, $Ge_2Sb_2Te_5$ was sputtered to a thickness of 14 nm on the second transparent lower protective film to form the second phase-change recording film. Subsequently, ZnS—$SiO_2$ was sputtered to a thickness of 18 nm to form the second transparent upper protective film. Then, a metallic reflective film whose data are listed in Table was formed on the second transparent upper protective film by a sputtering method. In this manner, the second (i.e., top) phase-change optical recording layer was created.

In Examples 1, 2, and 8, the Si foundation interference film was formed by sputtering. In Example 3, the Ge foundation interference film was formed by a sputtering method using Ar gas and a Ge target. In Example 4, the SiO film was formed by a reactive sputtering method using a target of Si within an ambient of a mixed gas of Ar and $O_2$. In Example 5, the SiN foundation interference film was formed by a reactive sputtering method using a target of Si within an ambient of a mixed gas of Ar and $N_2$. In Example 6, the GeO foundation interference film was formed by a reactive sputtering method using a target of Ge within an ambient of a mixed gas of Ar and $O_2$. In Example 7, the GeN foundation interference film was formed by a reactive sputtering method using a target of Ge within an ambient of a mixed gas of Ar and $N_2$.

In Example 2, two disks, each of which is Example 1, were glued together at their reflective films by an adhesive layer.

Figure 6:
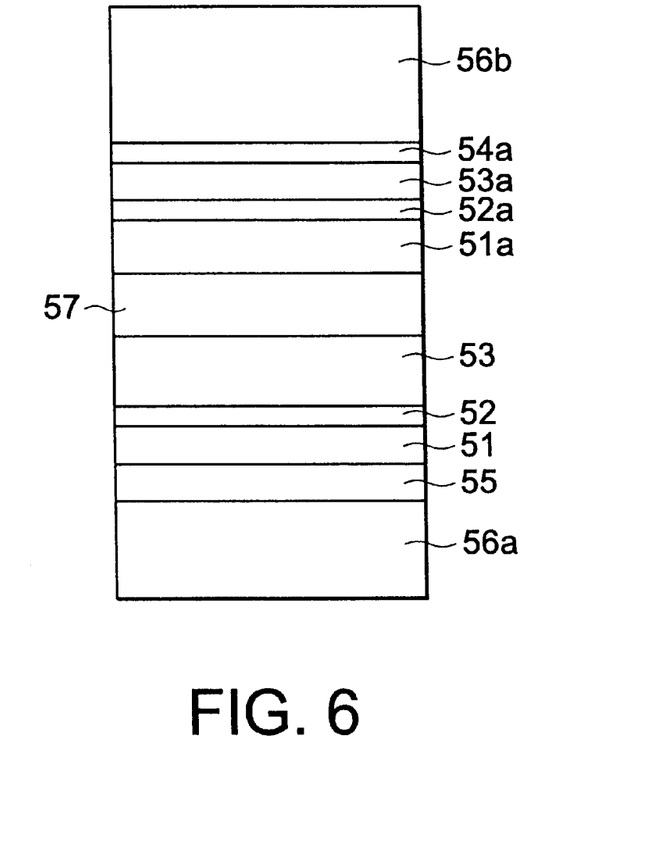
FIG. 6 is a cross-sectional view of an optical information recording medium in accordance with Example 8 of the invention.

Fabrication in accordance with Example 8 adopted the following method. FIG. 6 is a cross-sectional view showing the structure of an optical information recording medium in accordance with Example 8. First, a first phase-change optical recording layer was formed on a first light transmitting rigid substrate 56a. This phase-change optical recording layer was composed of a foundation interference film 55, a transparent lower protective film 51, a phase-change recording film 52, and a transparent top electrode 53. Then, a metallic reflective film 54a was formed on the second light transmitting rigid substrate 56b. A transparent lower protective film 53a having a thickness of 18 nm was formed on the reflective film 54a. A phase-change recording film 52a having a thickness of 14 nm was formed on the lower protective film 53a. Then, a transparent upper protective film 51a having a thickness of 170 nm was formed on the phase-change recording film 52a. These films 54a, 53a, 52a and 51a were formed in this order from the lower side. That is, the second phase-change optical recording layer was turned up and down on the second light transmitting rigid substrate 56b. This second light transmitting rigid substrate 56b was provided with a spiral tracking groove having a track pitch of 1.0 μm and running in a direction opposite to the groove in the first light transmitting rigid substrate 56a.

A UV-curable resin was applied by a spin-coating method as a film having a thickness of 40 μm between the two disks on which the aforementioned films were formed. Then, UV radiation was shone from the side of the first light transmitting rigid substrate to cure the UV-curable resin. In this way, a light transmitting spacer 57 was formed, and the two disks were glued together. An optical disk fabricated in this way is similar to the optical disk fabricated in accordance with Example 1 except that the second light transmitting rigid substrate is formed and that the light transmitting spacer has a different thickness.

TABLE

| No. | FOUNDATION INTERFERENCE FILM | | METALLIC REFLECTIVE FILM | |
|---|---|---|---|---|
| | MATERIAL | FILM THICKNESS (nm) | MATERIAL | FILM THICKNESS (nm) |
| EXAMPLE | | | | |
| 1 | Si | 100 | Al-2.5 atomic % Ti | 100 |
| 2 | Si | 100 | Al-2.5 atomic % Ti | 100 |
| 3 | Ge | 110 | Ge | 100 |
| 4 | SiO | 130 | Al-2.5 atomic % Ti | 100 |
| 5 | SiN | 120 | Al-2.5 atomic % Ti | 100 |
| 6 | GeO | 125 | Al-2.5 atomic % Ti | 100 |
| 7 | GeN | 135 | Al-2.5 atomic % Ti | 100 |
| 8 | Si | 100 | No film | 100 |

As Comparative Example 9, a polycarbonate substrate having a diameter of 120 mm, a thickness of 0.6 mm, and a track pitch of 1.0 μm was used as a light transmitting rigid substrate. $ZnS$—$SiO_2$ was sputtered as a transparent lower protective film to a thickness of 230 nm on the light transmitting rigid substrate. Then, $GE_2Sb_2Te_5$ was sputtered as a phase-change recording film having a thickness of 10 nm on the transparent lower protective film. Subsequently, $ZnS$—$SiO_2$ was sputtered as a transparent upper protective film having a thickness of 18 nm on the phase-change recording film. Thereafter, a Si transparent reflective film having a thickness of 60 nm was formed on the transparent upper protective film. In this way, the first phase-change optical recording layer was formed.

Then, a UV-curable resin was spin-coated to a thickness of 25 μm on the Si transparent reflective film. Then, a transparent stamper having a pregrooved track was brought into intimate contact with the UV-curable resin. The UV-curable resin was then cured by UV irradiation, and the stamper is removed. As a result, a good grooved track having a track pitch of 1.0 μm was transferred to the UV-curable resin. In this manner, a light transmitting spacer was created.

Then, $ZnS$—$SiO_2$ was sputtered as a second transparent lower protective film to a thickness of 230 nm on the light transmitting spacer. Then, $Ge_2Sb_2Te_5$ was sputtered as a second phase-change recording film having a thickness of 10 nm on the second transparent lower protective film. Subsequently, $ZnS$—$SiO_2$ was sputtered as a second transparent upper protective film having a thickness of 18 nm on the second phase-change recording film. Thereafter, an Al metallic reflective film was formed on the second transparent upper protective film by sputtering. In this way, the second (top) phase-change optical recording layer was formed.

The transmittance of the various Examples and Comparative examples described above were measured. Also, their recording, reading, and erasing characteristics were evaluated. The results are as follows. The transmittance of the first phase-change optical recording layer of Example 1 was 40% in a crystalline state (of the recording layer) and 38% in an amorphous state at the wavelength of laser light of 660 nm. In Example 4, the transmittance was 43% in a crystalline state and 41% in an amorphous state. In Example 5, the transmittance was 37% in a crystalline state and 39% in an amorphous state. In Example 7, the transmittance was 38% in a crystalline state and 39% in an amorphous state. In Example 8, the transmittance was 40% in a crystalline state and 38% in an amorphous state. In Comparative Example 9, the transmittance was 40% in a crystalline state and 68% in an amorphous state, which means that a very great difference was produced.

The characteristics for recording, reading, and erasing information were evaluated in the manner described below. The first and second phase-change optical recording layers in each optical disk were set to initial conditions. Then, the disk was rotated at 3600 rpm. A signal of 8.4 MHz having a duty factor of 50% was recorded on a track having a diameter of 30 mm in the first phase-change optical recording layer. Then, a signal of 2.2 MHz having a duty factor of 50% was written over the same track. Information was recorded, read, and erased using an optical head equipped with a semiconductor laser emitting a wavelength of 660 nm. The numerical aperture of the focusing lens was set to 0.6.

In Example 1, the record power and the erase power were set to 8 mW and 4 mW, respectively, to minimize the second harmonic distortion of the reproduced signal. Reading this track produced a good reproduced signal.

An offset signal was applied to the focus servo circuit of the optical head to shift the focal point of the laser light onto the second phase-change optical recording layer of the optical disk. Then, the optical disk was rotated at 3600 rpm. As a result, the record power and the erase power were set to 14 mW and 7 mW, respectively. Recording and reading were made on the optical disk. A good reproduced signal was obtained.

In Example 2, the record power and the erase power were set to 8 mW and 4 mW, respectively, to minimize the second harmonic distortion of the reproduced signal in the same way as in Example 1. Reading this track produced a good reproduced signal.

Then, an offset signal was applied to the focus servo circuit of the optical head to shift the focal point of the laser light onto the second phase-change optical recording layer of the optical disk. The disk was rotated at 3600 rpm. A signal of 8.0 MHz having a duty factor of 50% was recorded on a track having a radius of 31 mm. A signal having a frequency of 1.9 MHz and a duty factor of 50% was written over the same track. The record power and the erase power were set to 14 mW and 7 mW, respectively, to minimize the second harmonic distortion of the reproduced signal. Reading the track produced a good reproduced signal. Good recording and reading were confirmed, irrespective of the presence or absence of recording on the first phase-change optical recording layer. Recording and reading were done on the opposite surface. Good operation was confirmed.

In Example 3, the record power and the erase power were set to 8.8 mW and 4.4 mW, respectively, to minimize the second harmonic distortion of the reproduced signal. Reading the track resulted in a good reproduced signal.

Then, an offset signal was applied to the focus servo circuit of the optical head to shift the focal point of the laser light onto the second phase-change optical recording layer of the optical disk. The disk was rotated at 3600 rpm. The record power and the erase power were set to 14.2 mW and 7.6 mW, respectively. Reading the track produced a good reproduced signal.

In Example 4, the record power and the erase power were set to 7.7 mW and 3.8 mW, respectively, to minimize the second harmonic distortion of the reproduced signal. Reading the track produced a good reproduced signal.

Then, an offset signal was applied to the focus servo circuit of the optical head to shift the focal point of the laser light onto the second phase-change optical recording layer of the optical disk. The disk was rotated at 3600 rpm. The record power and the erase power were set to 13.5 mW and 7 mW, respectively. Reading the track produced a good reproduced signal.

In Example 5, the record power and the erase power were set to 7.8 mW and 4 mW, respectively, to minimize the second harmonic distortion of the reproduced signal. Reading the track produced a good reproduced signal.

Then, an offset signal was applied to the focus servo circuit of the optical head to shift the focal point of the laser light onto the second phase-change optical recording layer of the optical disk. The disk was rotated at 3600 rpm. The record power and the erase power were set to 14.3 mW and 7.3 mW, respectively. Reading the track produced a good reproduced signal.

In Example 6, the record power and the erase power were set to 8.3 mW and 4 mW, respectively, to minimize the second harmonic distortion of the reproduced signal. Reading the track produced a good reproduced signal.

Then, an offset signal was applied to the focus servo circuit of the optical head to shift the focal point of the laser light onto the second phase-change optical recording layer of the optical disk. The disk was rotated at 3600 rpm. The record power and the erase power were set to 14.6 mW and 8.0 mW, respectively. Recording and reading were done on this optical disk. A good reproduced signal was obtained.

In Example 7, the record power and the erase power were set to 8.1 mW and 4 mW, respectively, to minimize the second harmonic distortion of the reproduced signal. Reading the track produced a good reproduced signal.

Then, an offset signal was applied to the focus servo circuit of the optical head to shift the focal point of the laser light onto the second phase-change optical recording layer of the optical disk. The disk was rotated at 3600 rpm. The record power and the erase power were set to 13.9 mW and 7.3 mW, respectively. Recording and reading were done on this optical disk. A good reproduced signal was obtained.

In Example 8, the record power and the erase power were set to 8 mW and 4 mW, respectively, to minimize the second harmonic distortion of the reproduced signal. Reading the track produced a good reproduced signal.

Then, an offset signal was applied to the focus servo circuit of the optical head to shift the focal point of the laser light onto the second phase-change optical recording layer of the optical disk. The disk was rotated at 3600 rpm. The record power and the erase power were set to 14 mW and 7 mW, respectively. Recording and reading were done on this optical disk. A good reproduced signal was obtained.

In Examples 1 and 3–8, recording and reading were attempted on those regions of the second phase-change optical recording layer which were matched to the recorded and unrecorded regions of the first phase-change recording film. Equal signal quality was obtained without modifying the record power, the erase power, or the read power.

In Comparative Example 9, the record power and the erase power were set to 8 mW and 4 mW, respectively, to minimize the second harmonic distortion of the reproduced signal. Reading the track produced a good reproduced signal.

Then, an offset signal was applied to the focus servo circuit of the optical head to shift the focal point of the laser light onto the second phase-change optical recording layer of the optical disk. The disk was rotated at 3600 rpm at the area to not make a recording of first phase-charge optical recording layer. The record power and the erase power were set to 14 mW and 7 mW, respectively. Recording and reading were done on this optical disk. A good reproduced signal was obtained.

Recording was attempted on those regions of the second phase-change optical recording layer which were matched to the recorded regions of the first phase-change optical recording layer with a record power of 14 mW and an erase power of 7 mW with unsuccessful result. At first, a recording was made on the second phase-change optical recording layer. Then, a recording was made on the first phase-change optical recording layer. Good reading was not possible unless the read power was increased from 0.8 mW to 1.5 mW.

As described in detail thus far, the optical information recording medium in accordance with the present invention has a foundation interference film in each phase-change optical recording layer to adjust the transmittance of the phase-change optical recording layer for laser light. Therefore, almost uniform transmittance can be obtained irrespective of the presence or absence of recording on the phase-change recording film. This makes it unnecessary to change the recording conditions or reading conditions according to the presence or absence of recording.

Consequently, operability on the drive can be improved. By using a disk fabricated by laminating these phase-change optical recording layers, information can be well recorded, read, and erased at a high density.

What is claimed is:

1. An optical information recording medium having a light transmitting substrate and phase-change optical recording layers formed on the light transmitting substrate, each of the phase-change optical recording layers comprising:
   a phase-change recording film for recording and erasing information by a phase change caused by illumination of laser light;
   a transparent upper protective film formed on top of the phase-change recording film and for protecting the phase-change recording film against thermal deformation during recording and erasing of information;
   a transparent lower protective film formed -under the phase-change recording film and for protecting the phase-change recording film against thermal deformation during recording and erasing of information; and
   a foundation interference film formed under the transparent lower protective film and for adjusting the transmittance of the phase-change recording film for the laserlight.

2. An optical information recording medium having a light transmitting substrate and phase-change optical recording layers formed on the light transmitting substrate, each of the phase-change optical recording layers comprising:
   a phase-change recording film for recording and erasing information by a phase change caused by illumination of laser light;
   a transparent upper protective film formed on top of the phase-change recording film and for protecting the phase-change recording film against thermal deformation during recording and erasing of information;
   a transparent lower protective film formed under the phase-change recording film and for protecting the phase-change recording film against thermal deformation during recording and erasing of information; and
   a foundation interference film formed under the transparent lower protective film and for adjusting the transmittance of the phase-change recording film for the laser light,
   wherein recorded regions of the phase-change recording film show a transmittance that is 0.90 to 1.10 times the transmittance of unrecorded regions.

3. The optical information recording medium as claimed in claim 2, wherein the phase-change recording film contains at least one element selected from the group consisting of Ge, Sb, and Te.

4. The optical information recording medium as claimed in claim 2, wherein the transparent upper protective film and the transparent lower protective film contain ZnS and $SiO_2$.

5. The optical information recording medium as claimed in claim 2, wherein the foundation interference film contains at least one element selected from the group consisting of Si and Ge.

6. The optical information recording medium as claimed in claim 2, further comprising:
   a light transmitting spacer formed on the phase-change optical recording layer;
   a second phase-change optical recording layer formed on the light transmitting spacer; and
   the second phase-change optical recording layer having a second phase-change recording film for recording, reading, and erasing information by a phase change caused by illumination of laser light, and having a second transparent upper protective film formed on top of the second phase-change recording film and acting to protect the second phase-change recording film against thermal deformation during recording and erasing of information, and having a second transparent lower protective film formed under the second phase-change recording film and acting to protect the second phase-change recording film against thermal deformation during recording and erasing of information.

7. The optical information recording medium as claimed in claim 6,
   wherein the light transmitting spacer is a radiation-curable resin.

8. An optical information recording medium consisting of two disks each of which has a structure of the optical information recording medium as claimed in claim 6, and wherein their top phase-change optical recording layers are bonded together by adhesives.

9. The optical information recording medium as claimed in claim 1, wherein the phase-change recording film contains at least one element selected from the group consisting of Ge, Sb, and Te.

10. The optical information recording medium as claimed in claim 9, wherein the transparent upper protective film and the transparent lower protective film contain ZnS and $SiO_2$.

11. The optical information recording medium as claimed in claim 9, wherein the foundation interference film contains at least one element selected from the group consisting of Si and Ge.

12. The optical information recording medium as claimed in claim 1, wherein the transparent upper protective film and the transparent lower protective film contain ZnS and $SiO_2$.

13. The optical information recording medium as claimed in claim 1, wherein the foundation interference film contains at least one element selected from the group consisting of Si and Ge.

14. The optical information recording medium as claimed in claim 1, further comprising:
   a light transmitting spacer formed on the phase-change optical recording layer;
   a second phase-change optical recording layer formed on the light transmitting spacer; and
   the second phase-change optical recording layer having a second phase-change recording film for recording, reading, and erasing information by a phase change caused by illumination of laser light, and having a second transparent upper protective film formed on top of the second phase-change recording film and acting to protect the second phase-change recording film against thermal deformation during recording and erasing of information, and having a second transparent lower protective film formed under the second phase-change recording film and acting to protect the second phase-change recording film against thermal deformation during recording and erasing of information.

15. The optical information recording medium as claimed in claim 14, wherein the light transmitting spacer is a radiation-curable resin.

16. An optical information recording medium consisting of two disks each of which has a structure of the optical information recording medium as claimed in claim 1, and wherein their respective top phase-change optical recording layers are bonded together by adhesives.

17. A method for recording information on an optical information recording medium having a light transmitting substrate comprising the step of:

forming plural phase-change optical recording layers over the light transmitting substrate via transmission spacers, each of the phase-change optical recording layers having a top phase-change optical recording layer and non-top phase-change optical recording layers, the top phase-change optical recording layer having a first phase-change recording film for recording, reading, and erasing information by a phase change caused by illumination of laser light, and having a first transparent upper protective film formed on top of the first phase-change recording film and acting to protect the first phase-change recording film against thermal deformation during recording and erasing of information, and having a first transparent lower protective film formed under the first phase-change recording film and acting to protect the first transparent lower protective film against thermal deformation during recording and erasing of information, each of the non-top phase-change recording optical recording layers having a second phase-change recording film for recording and erasing information by a phase change caused by illumination of the laser light, and having a second transparent upper protective film formed on top of the second phase-change recording film and acting to protect the second phase-change recording film against thermal deformation during recording and erasing of information, and having a second transparent lower protective film formed under the second phase-change recording film and acting to protect the second transparent lower protective film against thermal deformation during recording and erasing of information, and having a foundation interference film formed under the second transparent lower protective film and acting to adjust transmittance of the second phase-change recording film for the laser light, the method further comprising the step of:

directing laser light to the optical information recording medium from a side of the light transmitting substrate while varying focal point of the laser light, thus causing a phase change in at least one of the first and second phase-change recording films.

18. A method for reading information from an optical information recording medium having a light transmitting substrate comprising the step of:

forming plural phase-change optical recording layers over the light transmitting substrate via transmission spacers, each of the phase-change optical recording layers having a top phase-change optical recording layer and on-top phase-change optical recording layers, the top phase-change optical recording layer having a first phase-change recording film for recording, reading, and erasing information by a phase change caused by illumination of laser light, and having a first transparent upper protective film formed on top of the first phase-change recording film and acting to protect the first phase-change recording film against thermal deformation during recording and erasing of information, and having a first transparent lower protective film formed under the first phase-change recording film and acting to protect the first transparent lower protective film against thermal deformation during recording and erasing of information, each of the non-top phase-change recording optical recording layers having a second phase-change recording film for recording and erasing information by a phase change caused by illumination of the laser light, and having a second transparent upper protective film formed on top of the second phase-change recording film and acting to protect the second phase-change recording film against thermal deformation during recording and erasing of information, and having a second transparent lower protective film formed under the second phase-change recording film and acting to protect the second transparent lower protective film against thermal deformation during recording and erasing of information, and having a foundation interference film formed under the second transparent lower protective film and acting to adjust transmittance of the second phase-change recording film for the laser light, the method further comprising the step of:

directing laser light to the optical information recording medium from a side of the light transmitting substrate while varying focal point/of the laser light, thus causing a phase change in at least one of the first and second phase-change recording films.

19. A method for erasing information from an optical information recording medium having a light transmitting substrate comprising the step of:

forming plural phase-change optical recording layers over the light transmitting substrate via transmission spacers, each of the phase-change optical recording layers having a top phase-change optical recording layer and non-top phase-change optical recording layers, the top phase-change optical recording layer having a first phase-change recording film for recording, reading, and erasing information by a phase change caused by illumination of laser light, and having a first transparent upper protective film formed on top of the first phase-change recording film and acting to protect the first phase-change recording film against thermal deformation during recording and erasing of information, and having a first transparent lower protective film formed under the first phase-change recording film and acting to protect the first transparent lower protective film against thermal deformation during recording and erasing of information, each of the non-top phase-change recording optical recording layers having a second phase-change recording film for recording and erasing information by a phase change caused by illumination of the laser light, and having a second transparent upper protective film formed on top of the second phase-change recording film and acting to protect the second phase-change recording film against thermal deformation during recording and erasing of information, and having a second transparent lower protective film formed under the second phase-change recording film and acting to protect the second transparent lower protective film against thermal deformation during recording and erasing of information, and having a foundation interference film formed under the second transparent lower protective film and acting to adjust transmittance of the second phase-change recording film for the laser light, the method further comprising the step of:

directing laser light to the optical information recording medium from a side of the light transmitting substrate while varying focal point of the laser light, thus causing a phase change in at least one of the first and second phase-change recording films.

* * * * *